United States Patent [19]

Blodgett et al.

[11] Patent Number: 5,720,252
[45] Date of Patent: Feb. 24, 1998

[54] HIGH POWER IGNITION ASSIST FOR AN ENGINE

[75] Inventors: Rodney G. Blodgett, Yates City; Anthony K. Chan, Peoria, both of Ill.; George Codina, North Hollywood, Calif.; Teala D. Lavell, Chillicothe, Ill.

[73] Assignee: Caterpillar Inc., Peoria, Ill.

[21] Appl. No.: 621,416

[22] Filed: Mar. 25, 1996

[51] Int. Cl.⁶ .................. F02P 3/04; F02P 15/00; F02B 3/04
[52] U.S. Cl. .................. 123/298; 123/169 EL; 123/620; 123/163; 123/604
[58] Field of Search .................. 123/169 EL, 163, 123/298, 604, 620

[56] References Cited

U.S. PATENT DOCUMENTS

| | | | |
|---|---|---|---|
| 3,107,658 | 10/1963 | Meurer | 123/169 EL |
| 3,534,714 | 10/1970 | Urlaab | 123/169 EL |
| 3,970,053 | 7/1976 | Goodacre | 123/298 |
| 4,557,229 | 12/1985 | Kashima et al. | 123/169 EL |
| 5,058,548 | 10/1991 | Morikawa et al. | 123/298 |
| 5,335,635 | 8/1994 | Kadoi et al. | 123/298 |
| 5,577,473 | 11/1996 | Linder | 123/298 |

FOREIGN PATENT DOCUMENTS

| 160514 | 7/1986 | Japan | 123/298 |
|---|---|---|---|

Primary Examiner—Willis R. Wolfe
Attorney, Agent, or Firm—Calvin E. Glastetter

[57] ABSTRACT

A spark ignition system of an internal combustion engine has a first electrode and a second electrode spaced from each other operating at high voltages to produce a spark in a combustion zone of the engine. The construction of the system permits the formation of long length sparks with a train of electrical pulses having a shortened total burst duration having higher power while using lower energy.

15 Claims, 2 Drawing Sheets

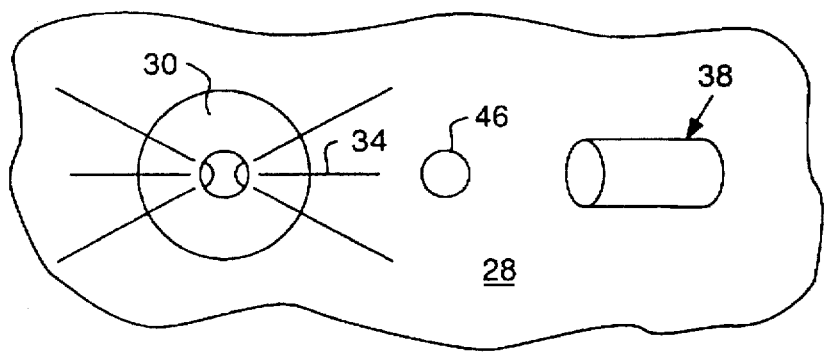
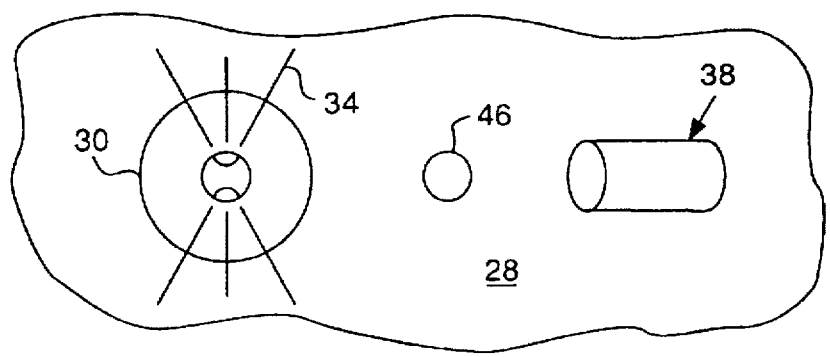
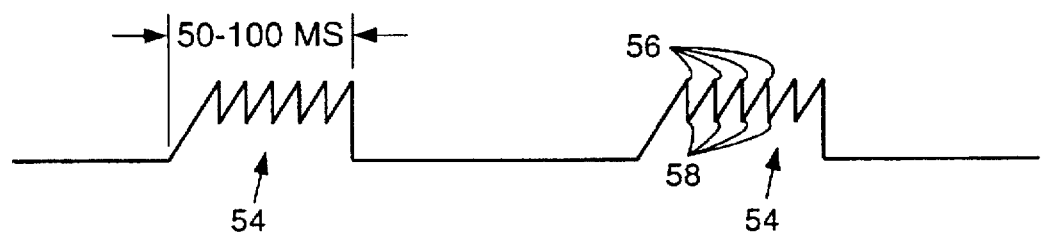

HIGH POWER IGNITION ASSIST FOR AN ENGINE

TECHNICAL FIELD

The present invention relates to the spark ignition system of an internal combustion engine, and more particularly to a system for passing the spark from one electrode to a second electrode through the combustion zone.

BACKGROUND ART

Since the advent of diesel cycle engines, a great deal of research has been conducted to increase the efficiency of the engine. One primary area of investigation was directed to increasing the efficiency for the fuel combustion. A principle factor resided in generating an efficient spark directed in an efficient manner. Known diesel cycle engines sometimes use a glow plug to enhance combustion of the fuel.

Problems that continue to hamper advancement are the limitations of gap length between electrodes, control of spark duration, and the longevity of the system. Another problem is to convert the diesel cycle engine from using the glow plug into a spark ignition system.

The present invention is directed to overcoming one or more of these problems.

DISCLOSURE OF THE INVENTION

In one aspect of the present invention, a spark ignition system of an internal combustion engine has a controllable spark initiation system, a step-up transformer connectable to the controllable spark ignition system, a piston having a face and a cylinder having an axis, a top and sidewalls. The piston is positioned within the cylinder with the piston face adjacent the cylinder top. The piston face, cylinder top and cylinder sidewalls define the combustion zone.

A first electrode extends through the engine structure into the combustion zone. The first electrode is connected to the step-up transformer. A second electrode is connected to the engine structure at a location within the combustion zone adjacent the first electrode.

The present invention provides a high power spark ignition system for a diesel cycle engine wherein the two electrodes are spaced from each other to increase spark size and control duration which improves the efficiency of the engine.

BRIEF DESCRIPTION OF THE DRAWINGS

FIG. 3 is a diagrammatic view as show by view line 3—3 in FIG. 1;

FIG. 4 is a diagrammatic view showing the fuel injector rotated; and

FIG. 5 is a diagrammatic view showing the pulsed spark.

BEST MODE FOR CARRYING OUT THE INVENTION

Figure 1:
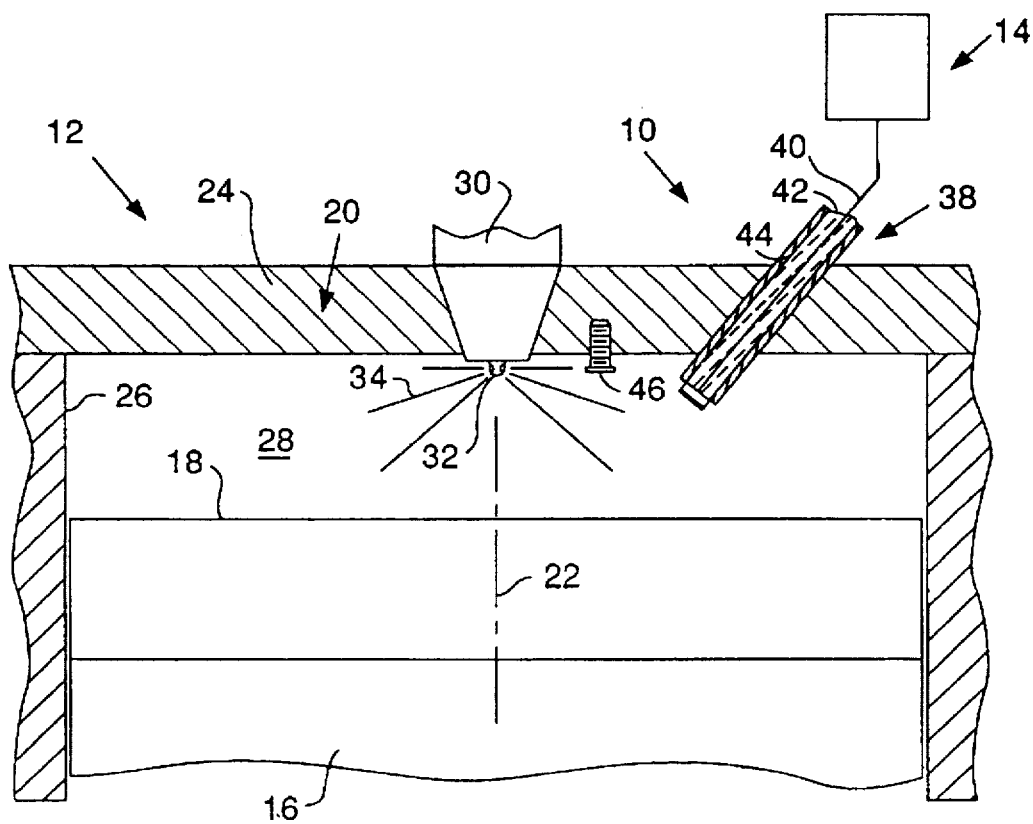
FIG. 1 is a diagrammatic side view in partial section showing the system of this invention.
Figure 2:
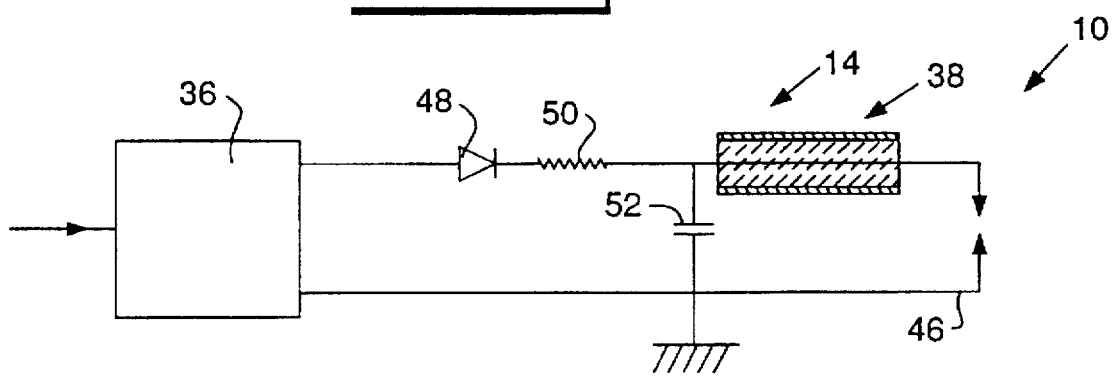
FIG. 2 is a diagrammatic schematic of the spark ignition system of the present invention.

Referring to FIGS. 1 and 2, a spark ignition system 10 of an internal combustion engine 12 has a controllable spark initiation system 14 which modernly is electronically controlled. In this particular arrangement the engine is envisioned to be a diesel cycle engine, however other types of engines could be used without departing from the scope of the invention. The engine 12 has a piston 16 which has a piston face 18. The structure of the engine 12 also has a cylinder 20 which has an axis 22, a top 24 and sidewalls 26. The piston 16 is positioned within the cylinder 20 with the piston face 18 adjacent the cylinder top 24. The piston face 18, cylinder top 24 and cylinder sidewalls 26 define a combustion zone 28. A fuel injector 30 in the cylinder top 24 is positioned generally coaxial with the cylinder 20 and the combustion zone 28. The fuel injector 30 includes an injector nozzle 32 having holes for fuel passage so that fuel 34 is sprayed into the combustion zone 28. The injector nozzle can have one or more holes for spraying fuel into the combustion zone. Such apparatus is well known in the engine art.

The controllable spark system 14 has a step-up pulse transformer 36, as is well known in the art, connectable to the spark initiation system 10 of the engine 12. The transformer 36 boosts the voltage from about 24 volts to a voltage in a range of about 20 to about 60 kilo volts(KV). The spark initiation system 10 and the transformer 36 of this invention are constructed to deliver a train of electrical pluses having a total burst duration in the range from about 50 to about 100 micro seconds. As is well understood in the art, boosting of the voltage and controlling the spark duration in the system of this invention does not require design work of such an extended period as to be classified as being of an inventive nature.

A first electrode 38 extends through the cylinder top 24 and extend into the combustion zone 28 toward the piston face 18. In this embodiment the electrode 38 is shown as extending through the cylinder top, however the electrode can extend through other portions of the engine structure without departing from the scope of the invention. The first electrode 38 is electrically connected to the controllable spark system 14. The first electrode 38 includes a central rod 40, connectable to the controllable spark system 14, a insulator 42 which encases the central rod and a metal sleeve 44 around the insulator 42. In this embodiment the insulator 42 is made from a high voltage high dielectric ceramic material, however any other suitable material could be used without departing from the scope of the invention.

A second electrode 46 is connected to the cylinder top 24 at a location within the combustion zone 28 and adjacent the first electrode 38. The second electrode 46 is spaced from the first electrode 38 at a location about 5 mm apart to produce a long spark. The second electrode 46 extends from the cylinder top 24 toward the piston face 18. The second electrode 46, in this concept, is a separate piece and is threadably removably connected to the cylinder top 24. The second electrode 46 could be an integral part of the cylinder top 24 without departing from the scope of the invention, such a being welded to or being formed on the cylinder top 24. In this embodiment the electrode 46 is shown as being connected to the cylinder top, however the electrode can be connected to the engine structure anywhere within the combustion zone without departing from the scope of the invention.

Referring to FIG. 2, the spark ignition system 10 is shown in a diagrammic representation. The spark ignition system 10 includes the controllable spark system 14, the first electrode 38 and the second electrode 46. The controllable spark system 14 includes a high voltage power source such as the pulse step-up transformer 36, a diode 48, a coil inductor 50 and a capacitor 52 which is connected between the first and second electrodes 38, 46. The insulator 42 and metal sleeve 44 comprise a capacitor structure which in certain conditions could be used to replace the capacitor 52. By having the proper geometric configuration with approbate parameters (i.e. with a high dielectric insulator) the first electrode 38 and the cylinder top 24 could be constructed so that they combine to form a capacitor.

Referring to FIG. 3, the fuel injector 30 is so positioned that the electrodes 38, 46 are directly within the fuel 34 spray into the combustion zone 28.

Referring to FIG. 4, the fuel injector 30 is so positioned that the electrodes 38, 46 are out of the direct fuel 34 spray within the combustion zone 28. The hole in the injector nozzle can be positioned, other then described above, to achieve optimum performance without departing from the scope of the invention.

Referring to FIG. 5, the energy discharge characteristics are shown for producing a spark 54 having a duration of about 50 to 100 micro seconds. The spark 54 is formed from a series of capacitor 52 charges and discharges, as shown by a charge slope 56 and a discharge slope 58. The coil inductor 50 controls the amount of charging current into the capacitor 52. The capacitor recharges within a period defined by the values of the coil inductor 50 and the capacitor 52. The breakdown voltage of the spark is automatically determined by the distance between the electrodes 38, 46, the pressure within the combustion zone 28 and the fuel mixture composition.

For purposes of brevity, the subject system has been described relative to a single combustion zone of an engine. It should be understood that the subject system can be utilized in multiple combustion zones and multiple cylinders within the engine and such multiple use is preferred.

INDUSTRIAL APPLICABILITY

In the operation of the system of this invention, any engine using glow plugs could easily be modified to use a spark ignition system as disclosed in the present invention. The controllable spark system 14 produces a high voltage spark which is passed from the first electrode 38 to the second electrode 46. The larger voltage and greater gap between electrodes function to efficiency ignite ultra lean mixtures of fuel for reduced emission and fuel consumption.

In view of the forgoing, it is readily apparent that the structure of the present invention provides an engine and spark system that will produce a spark having higher power and shorter duration in comparison to present ignition systems.

Other aspects, objects and advantages of this invention can be obtained from a study of the drawings, the disclosure and the appended claims.

We claim:

1. A spark ignition system of an internal combustion engine structure having a controllable spark initiation system, a set-up transformer connectable to the controllable spark initiation system, a piston having a face and a cylinder having an axis, a top and sidewalls, the piston being positioned within the cylinder with the piston face adjacent the cylinder top, the piston face, cylinder top and cylinder sidewalls defining a combustion zone, comprising:

a first electrode extending through the engine structure into the combustion zone, the first electrode being connected to the step-up transformer; and a second electrode connected to the cylinder at a location spaced about 5 mm from the first electrode within the combustion zone and defines a spark discharge system associated with the combustion system to deliver a train of electrical pulses having a total burst duration in the range of about 50 to about 100 micro seconds.

2. A system, as set forth in claim 1, wherein the second electrode connected to the engine structure is integral with the cylinder top.

3. A system, as set forth in claim 1, wherein the second electrode connected to the engine structure is removably connected to the cylinder top.

4. A system, as set forth in claim 1, wherein the step-up pulse transformer operators in the range of about 20 to about 60 kilo volts.

5. A system, as set forth in claim 1, wherein the electrodes extend from one of the cylinder top and the cylinder sidewalls into the combustion zone.

6. A system, as set forth in claim 1, wherein the cylinder top has a fuel injection nozzle positioned generally coaxial with the cylinder and the combustion zone and the electrodes are positioned transverse the cylinder axis.

7. A system, as set forth in claim 6, wherein the fuel injection nozzle is positioned so that electrodes are in the fuel spray.

8. A system, as set forth in claim 6, wherein the fuel injection nozzle is positioned so that the electrodes are out of the fuel spray.

9. A system, as set forth in claim 1, wherein the first electrode includes a central rod, a insulator encasing the central rod and a metal sleeve around the insulator.

10. A system, as set forth in claim 9, wherein the insulator is formed from a high voltage high dielectric ceramic material.

11. A system, as set forth in claim 10, wherein the first electrode and cylinder top combine to form a capacitor.

12. A system, as set forth in claim 1, wherein the controllable spark initiation system includes a capacitor.

13. A system, as set forth in claim 12, wherein the controllable spark initiation system further includes a coil inductor to control the amount of charging current into the capacitor.

14. A system, as set forth in claim 13, wherein the capacitor charges within a period defined by the values of the coil inductor and the capacitor.

15. A system, as set forth in claim 14, wherein the breakdown voltage is automatically determined by the distance between the electrodes, the pressure and fuel mixture composition within the combustion zone.

* * * * *